United States Patent
Backx et al.

(10) Patent No.: US 9,297,413 B2
(45) Date of Patent: Mar. 29, 2016

(54) INTEGRAL METHOD FOR VIBRATION COMPENSATION AND MISALIGNMENT PREVENTION IN ROTOR DYNAMIC SYSTEMS

(71) Applicant: Micro Turbine Technology, BV, Eindhoven (NL)

(72) Inventors: Antonius Cornelis Petrus Maria Backx, Veldhoven (NL); Maikel Marinus Wilhelmus Brands, Oijen (NL); Johan Cornelis Compter, Eindhoven (NL)

(73) Assignee: Micro Turbine Technology B.V., Eindhoven (NL)

( * ) Notice: Subject to any disclaimer, the term of this patent is extended or adjusted under 35 U.S.C. 154(b) by 336 days.

(21) Appl. No.: 14/066,339

(22) Filed: Oct. 29, 2013

(65) Prior Publication Data
US 2014/0050425 A1 Feb. 20, 2014

Related U.S. Application Data

(63) Continuation of application No. PCT/NL2012/050303, filed on May 1, 2012.

(51) Int. Cl.
*F16F 15/02* (2006.01)
*F16C 23/00* (2006.01)
*F16F 15/00* (2006.01)
*F16C 3/02* (2006.01)

(52) U.S. Cl.
CPC . *F16C 23/00* (2013.01); *F16C 3/02* (2013.01); *F16F 15/005* (2013.01); *F16F 15/02* (2013.01)

(58) Field of Classification Search
CPC .......... F16C 23/00; F16F 15/005; F16F 15/02
USPC ............................................. 73/660; 464/180
See application file for complete search history.

(56) References Cited

U.S. PATENT DOCUMENTS

| 2002/0139603 | A1 | 10/2002 | Aiken | |
|---|---|---|---|---|
| 2010/0145639 | A1* | 6/2010 | Fu | G01H 1/003 702/56 |
| 2011/0259103 | A1* | 10/2011 | Arar | G01B 21/24 73/579 |

FOREIGN PATENT DOCUMENTS

| DE | 40 35 615 | 5/1992 |
|---|---|---|
| EP | 0715 131 | 6/1996 |
| EP | 2 060 810 | 5/2009 |
| GB | 839292 | 6/1960 |
| GB | 2 222 279 | 2/1990 |
| SU | 1 810 675 | 4/1993 |
| SU | 1810675 | 4/1993 |
| WO | WO 98/30813 | 7/1998 |
| WO | WO 99/04181 | 1/1999 |

* cited by examiner

*Primary Examiner* — John Chapman, Jr.
(74) *Attorney, Agent, or Firm* — Eric Karich; Karich & Associates

(57) ABSTRACT

A method for suppressing vibrations, the method having the steps of providing a first device having a first rotating shaft, and a second device having a second rotating shaft. The orbits of the first rotating shaft are measured are analyzed, and the misalignment and unbalance is determined. The first rotating shaft and the bearings are then displaced to eliminate vibrations.

7 Claims, 3 Drawing Sheets

INTEGRAL METHOD FOR VIBRATION COMPENSATION AND MISALIGNMENT PREVENTION IN ROTOR DYNAMIC SYSTEMS

CROSS-REFERENCE TO RELATED APPLICATIONS

This application for a utility patent is a continuation of a previously filed PCT application PCT/NL2012/050303 filed May 1, 2012. The PCT application claims priority to NL 2006686 filed Apr. 29, 2011.

DESCRIPTION

Technical Field of the Invention

The invention relates to method for suppressing vibrations in a first device provided with a first rotating shaft which is connected to a second rotating shaft of a second device, which first and second shafts are each journaled at two places at distance of each other, and which vibrations are caused by misalignment between the first and second shafts and unbalance of the first or second shaft.

Background of the Invention

When two devices with rotating shafts, like for example a motor and a generator, are coupled then one of the devices (for example, the motor or thermodynamic engine) can be used to drive the other device (for example, the generator). These devices are the so-called rotor dynamic systems, of which each consists in general of a rotor (including a shaft) and a stator (housing). Rotor dynamic systems can be both subcritical and supercritical. Such rotor dynamic systems may include motors, generators, compressors, compressors, turbines and expanders. They may also relate to high-speed coupled motors, generators and mini- and micro gas turbines. During coupling, the two rotating systems need to be aligned very carefully to avoid forces which act on the bearings of the systems. In reality, there always will be some misalignment. The forces due to misalignment will cause vibrations and for that reason the bearings will wear more rapidly. To align rotors is very time consuming and difficult and is therefore a troublesome method when coupling these systems in a production line. In addition, a 100% or perfect alignment can never or hardly be achieved.

Rotor dynamic systems usually have not only misalignment but also residual mass unbalances. Like misalignment, it is almost impossible to create a perfectly balanced rotor. There will always be some mass unbalance on the shaft. This mass unbalance will create vibrations inside the rotor dynamic system which will cause bearing wear, and another unwelcome effect, e.g. noise. Also with respect to mass unbalance, to eliminate this unbalance is very time consuming and therefore a troublesome method when coupling rotor dynamic systems—especially in production. As a result, the lifetime of coupled rotor dynamic systems is limited: Vibrations and misalignment cause wear of the system components such as the shaft and bearing system components.

SUMMARY OF THE INVENTION

It is an object of the present invention to provide a method of the type defined in the opening paragraph which does not have the disadvantages of the known methods. For this purpose the method according to the invention is characterized in that during rotation of the first shaft, the orbits of the center of the first shaft at the bearings are measured, then these orbits are analyzed, and the misalignment and unbalance are determined. After this, still during rotation of the first shaft, the first device is displaced to eliminate the misalignment, and the bearings are continuously displaced in radial direction to eliminate vibrations due to unbalance.

Misalignment in combination with mass unbalance in the rotor will create an ellipse-shaped orbit of the centre of the shaft, by which it becomes possible to detect whether there is misalignment or not. So with help of mass unbalance it becomes possible to detect and correct misalignment. Eliminating the vibrations due to mass unbalance and misalignment in service instead of during production offers the following advantages:

Reduces production costs significantly;
Reduces wear;
Extends life;
Suppresses noise;
Provides on-line monitoring, service and maintenance of rotating systems; and
Reduces the overall "costs of ownership" of the system.

The method according to the invention can be applied to both subcritical and supercritical rotor dynamic systems.

In addition, the invention is particularly applicable in rotor dynamic systems where components are not only subject to rotor dynamic forces but also to thermal influences such as expansion, thermal shock and reduction of strength and stiffness causing additional vibrations over the lifetime of the system.

A preferred embodiment of the method according to the invention is characterized in that first the misalignment will be eliminated, then the vibrations due to the unbalance will be eliminated which again may cause (after a while) misalignment (for example due to thermal expansion of components) which then first will be eliminated before the vibrations due to unbalance will be further eliminated.

A further preferred embodiment of the method according to the invention is characterized in that when misalignment is detected, the orbits of the centre of the first shaft will be reconstructed and the direction in which and/or angles over which the first device has to be displaced in order to eliminate misalignment will be derived, and then the first device is displaced in that direction and/or over those angles until no misalignment is detected anymore, then when unbalance is detected, the vibration which are the result of this unbalance are determined and then the bearings are displaced continuously in radial direction until no unbalance is detected anymore, then is checked if misalignment has incurred during eliminating of vibrations due to unbalance and when necessary will be eliminated again.

The invention further relates to a system comprising a first device provided with a first rotating shaft, as well as a second device provided with a second rotating shaft, and a coupling connecting the first and second shafts, which devices each comprise a housing with two bearings at distance of each other, via which the shafts are journaled, which bearings each comprise an outer ring which is connected to the housing.

With respect to the system the invention is characterized in that each outer ring of the bearing is connected to the housing via two displacement means (vibration actuators) which are at an angle with respect to each other and two vibration sensors which are in radial direction opposite to the displacement means (vibration actuators), and the system comprises four supports via which the housing of the first device is supported on a basement, which supports each comprise further displacement means (misalignment actuators) for moving the house of the first device. The novelty of this system is that it uses displacement means (misalignment actuators) placed underneath the first device. Then the displacement (vibration) sensors placed between the outer ring of the bearings and the housing determine the force which is acting on the bearings. These displacement (vibration) measurements are then used to correct misalignment. If there is no indication of misalignment anymore, the system switches from misalignment prevention to mass unbalance (vibration) compensation. This compensation is done by displacement means (vibration actuators) which are also placed between the bearings and the housing in opposite direction of the displacement (vibration) sensors. As soon as a vibration controller gets an indication of misalignment then this controller switches back from mass unbalance elimination (vibration compensation) to misalignment prevention.

In general, the displacement means:

Translate eclectic signal into linear displacement;
Translate eclectic signal into angular displacement;
Act along the axis of rotation; and
Act along the transverse axis.

The displacement means can be piezo elements, pull-push magnets, voice coils, magnetic bearings, integral parts of a motor low-frequency linear actuators, or integral parts of a generator.

The sensors can be piezo elements, strain gauges (along actuator), voice coils, integral parts of a motor, or integral parts of a generator.

An embodiment of the system according to the invention is characterized in that the system further comprises a vibration controller which is connected to the displacement means (vibration actuators), as well as a misalignment controller which is connected to the further displacement means (misalignment actuators), and a switch connected to both controllers and to which the vibration sensors are connected, which switch can connect the vibration sensors at choice to the vibration controller and the misalignment controller and which misalignment controller can switch the switch to the position in which the vibration sensors are connected to the vibration controller and the vibration controller can switch the switch to the position in which the vibration sensors are connected to the misalignment controller.

Preferably the displacement means and/or the vibration sensors and/or the further displacement means are piezo elements.

A further embodiment of the system according to the invention is characterized in that at each bearing of the first device both displacement means (vibration actuators) and vibration sensors are constituted by two piezo elements, which each can measure the displacement and can move the outer ring simultaneously, and that passive elements are present between the outer ring and the housing at places opposite to the piezo elements, which passive elements have a stiffness almost equal to that of the piezo elements.

BRIEF DESCRIPTION OF THE DRAWINGS

The invention will be further elucidated below on the basis of drawings. These drawings show an embodiment of the system according to the present invention. In the drawings.

DETAILED DESCRIPTION OF THE DRAWINGS

Figure 1:
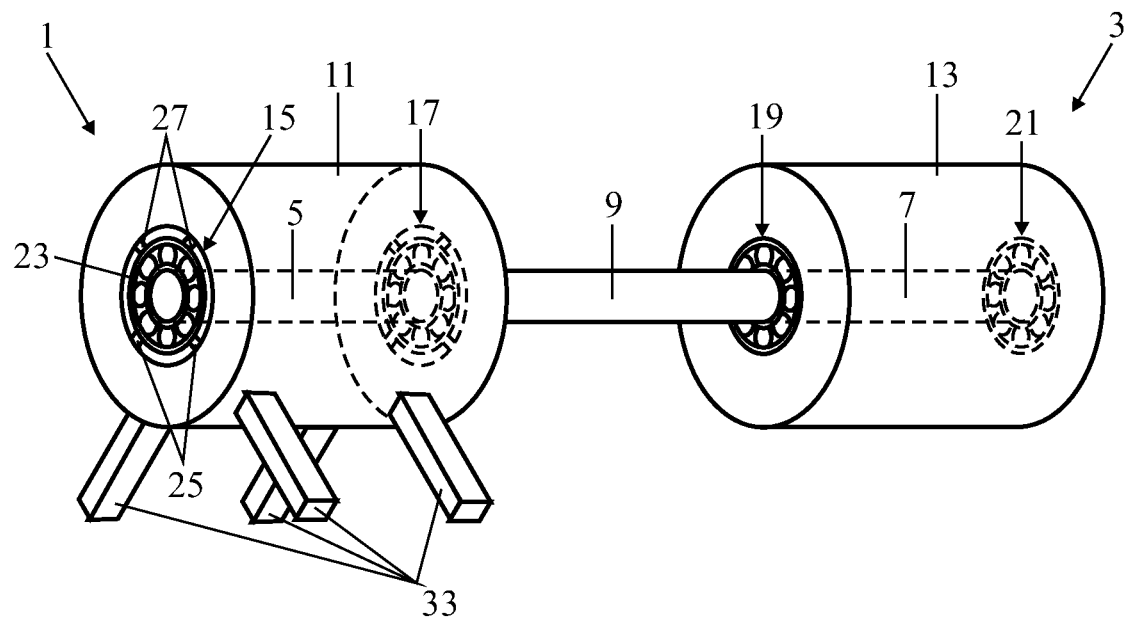
FIG. 1 is a three dimensional view of the complete (mechanical) setup of the system, including misalignment actuators, vibration actuators and vibration sensors.
Figure 2:
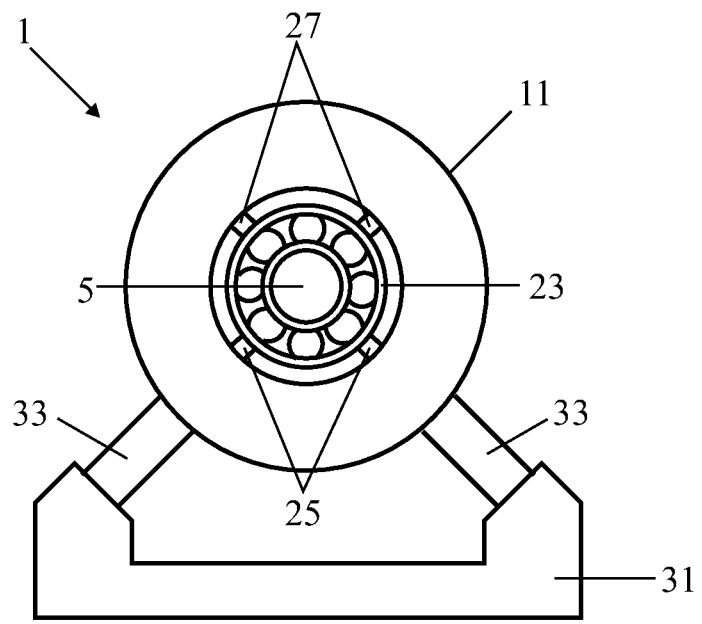
FIG. 2 is a cross sectional view of the generator (mechanical), including misalignment actuators, vibration actuators and vibration sensors.

In FIGS. 1 and 2 an embodiment is shown of the system according to the present invention in a perspective view and in a sectional view respectively. The system comprises a first device 1 provided with a first rotating shaft 5, as well as a second device 3 provided with a second rotating shaft 7, and a coupling 9 connecting the first and second shafts. The first device 1 is a generator which is driven by the second device which is constituted as a motor 3. The coupling 9 is constituted as a flexible shaft. Each device 1, 3 comprises a housing 11, 13 with two shaft bearings 15, 17 and 19, 21 at distance of each other.

Each bearing comprises an outer ring 23 which is connected to the housing 11 via two displacement means (vibration actuators) 25 which are at an angle with respect to each other and two vibration sensors 27 which are in radial direction opposite the displacement means (vibration actuators). The displacement means 25 (vibration actuators) and the vibration sensors 27 (vibration sensors) can be implemented as, but not limited to, piezo elements.

The system further comprises four displacement means 33 (misalignment actuators) supported on a basement 31. These displacement means 33 can be implemented as, but not limited to, piezo elements.

Misalignment occurs when the shafts 5 and 7 of both devices which are coupled to each other are not perfectly aligned. Misalignment can be categorized in two types: (1) parallel misalignment and (2) angular misalignment. It is also possible (and most likely) that both misalignment types occur simultaneously. Further these two misalignment types occur in radial direction, which means perpendicular to the axis of rotation and can therefore be seen in two directions (x and y direction).

Figure 3:
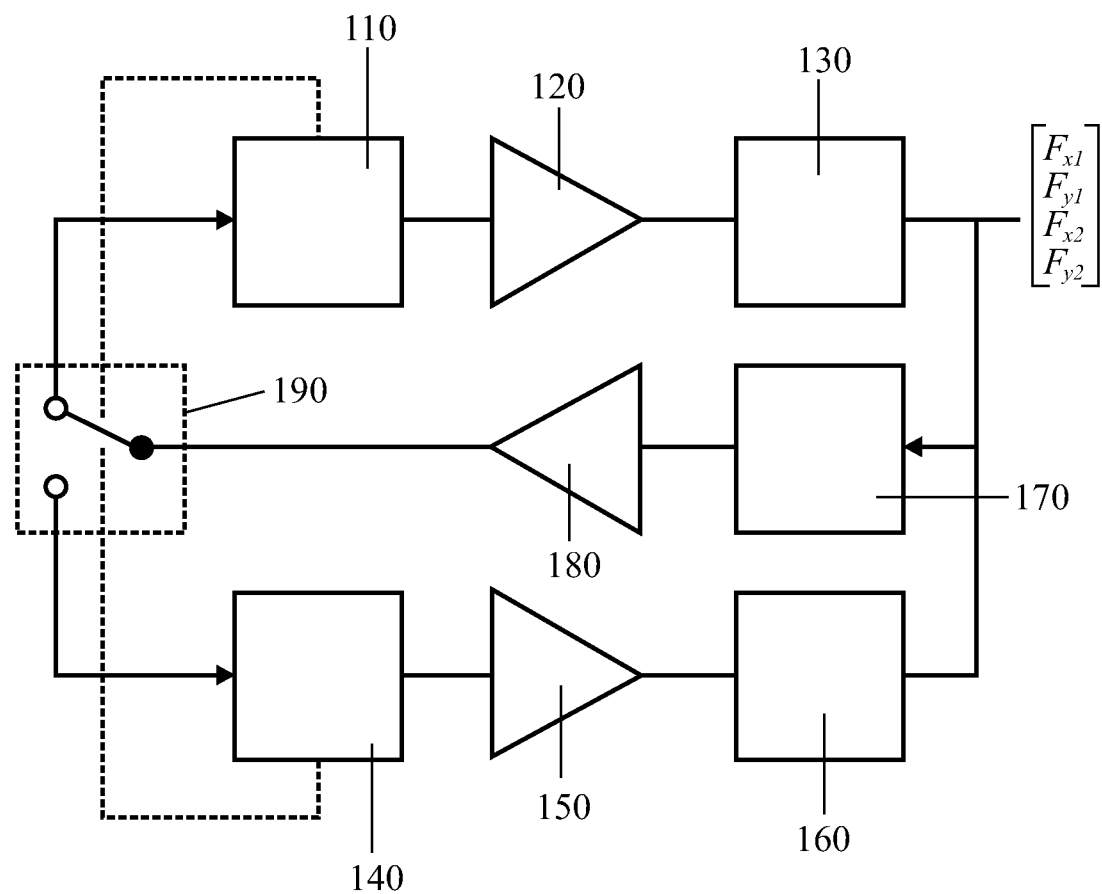
FIG. 3 is a schematic representation of the vibration/misalignment control system, including controllers, amplifiers and the plant of the system.

In FIG. 3 a schematic representation of the vibration/misalignment control system is shown. The vibration/misalignment control system comprises a vibration controller 110 connected to an amplifier 120 to drive the displacement means (vibration actuators), which are part of a mechanical configuration 130 which further includes the mass of the rotor, the mass of the bearings and the mass of the stator. The vibration/misalignment control system further comprises a misalignment controller 140 connected to the further displacement means (misalignment actuators) via an amplifier 150 to drive these means (misalignment actuators). These further displacement means (misalignment actuators) are part of a further mechanical configuration 160 which further includes the mass of the stator, the mass of the bearings and the mass of the rotor. Further, the vibration/misalignment control system comprises a vibration sensor 170 which detects the vibrations and is connected to a vibration measurement amplifier and filter 180. This amplifier is connected to a switch 190 to set either misalignment control or vibration control. The vibration controller 110 switches switch 190 automatically to the misalignment controller 140 if misalignment is observed.

Figure 4:
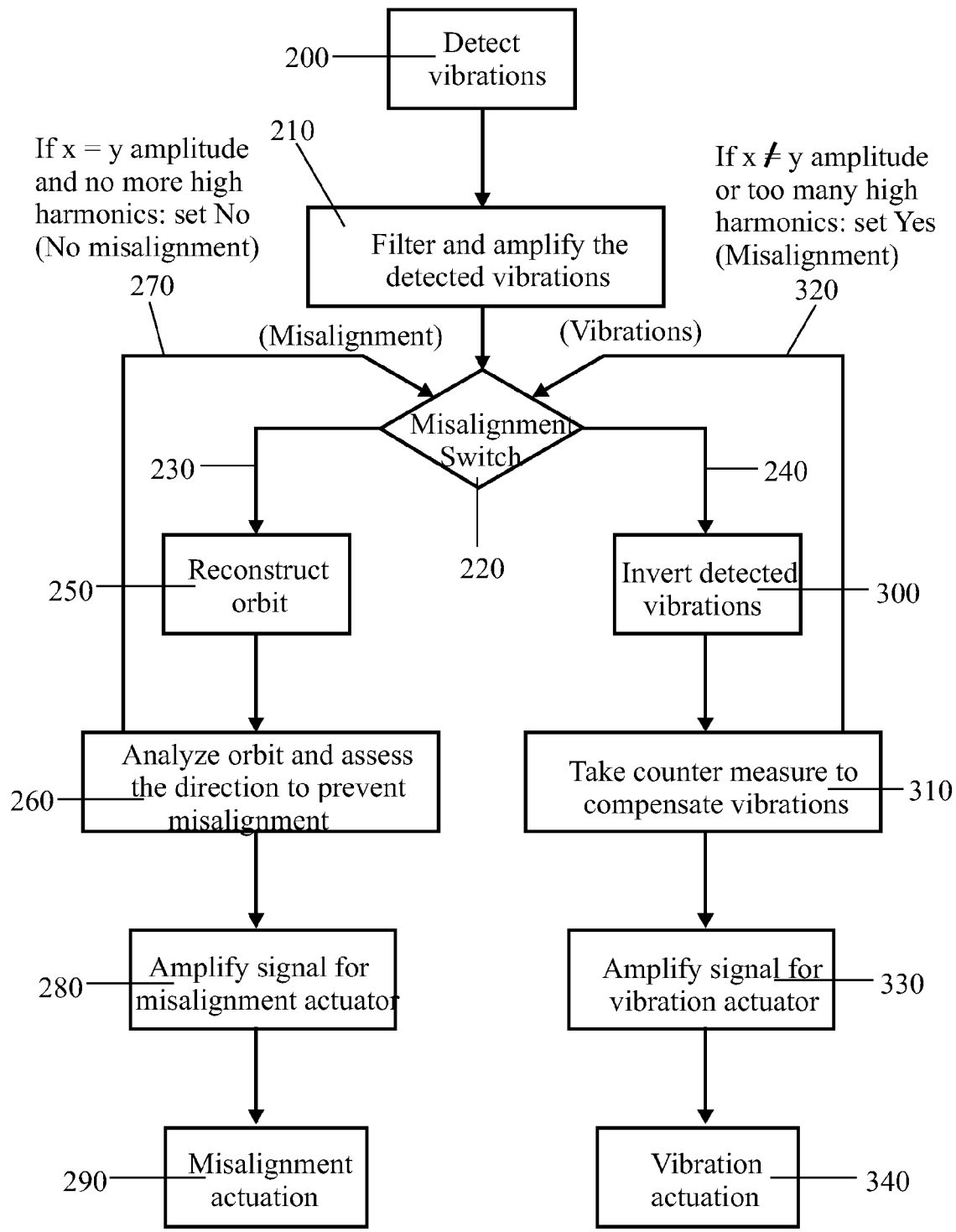
FIG. 4 is a flowchart illustrating operation of the vibration/misalignment control system of the system according to the present invention.

The operation of the system of the present invention will now be discussed with reference to the flow chart in FIG. 4. At block 200, the displacement sensor 170 detects vibrations. At block 210, the amplifier/filter 180 amplifies the signal of the sensor and filters of high frequencies which cannot be compensated by the displacement means (vibration actuators 25). At block 220 occurs the following: If there is misalignment, the misalignment branch 230 is carried out. If not, the vibration branch 240 is carried out. The misalignment branch reconstructs at block 250 the orbits of the centre of the rotor shaft 3. Then, the controller analyses whether there is misalignment at block 260: If not, line 270 sets 220 to vibration the next time the flowchart is carried out starting at block 200, the switch 190 in FIG. 3 is set to vibration and the next time block 220 of the flowchart is carried out the vibrations branch 240 is followed. If yes, then the controller at block 260 determines the signal for the further displacement means (misalignment actuators 33) and passes this signal to block 280 the driver for the further displacement means. At block 280, the signal is amplified and/or boosted and passed through the further displacement means (misalignment actuators) at block 290.

If the vibrations branch 240 is carried out then first the signal is inverted at block 300. Then the controller takes counter measures to compensate the vibrations at block 310. As soon as there are higher harmonics in one of the two signals (x and/or y) or the x amplitude is higher than the y amplitude which is an indication that there is misalignment, then the system is switched back 320 to the misalignment branch 230. At block 330 the signal from the controller is amplified and passed through the displacement means (vibration actuator 25) at block 340.

Although the present invention is elucidated above on the basis of the given drawings, it should be noted that this invention is not limited whatsoever to the embodiments shown in the drawings. The invention also extends to all embodiments deviating from the embodiments shown in the drawings within the context defined by the claims. Instead of four piezo elements the displacement means (vibration actuators) and vibration sensors can be constituted by two piezo elements, which each can measure the displacement and can move the outer ring. In that case passive elements are present between the outer ring and the housing at places opposite to the piezo elements. These passive elements preferably have stiffness almost equal to that of the piezo elements. Means other than piezo elements can be used as given above under the Summary of invention.

The invention claimed is:

1. A method for suppressing vibrations, the method comprising the steps of:
   providing a first device provided with a first rotating shaft which is connected to a second rotating shaft of a second device, wherein the first rotating shaft and second rotating shaft are each journaled at two places at some distance from each other, and wherein vibrations are caused by misalignment between the first rotating shaft and second rotating shaft, causing the first rotating shaft or the second rotating shaft to be unbalanced;
   measuring the orbits of the center of the first rotating shaft at bearings during rotation of the first rotating shaft;
   analyzing the orbits;
   determining the misalignment and unbalance;
   displacing the first rotating shaft during rotation of the first rotating shaft, to eliminate the misalignment; and
   displacing in a continuous manner, the bearings in the radial direction to eliminate vibrations due to an unbalance.

2. The method according to claim 1, further comprising the steps of:
   eliminating the first misalignment;
   eliminating the vibrations due to the unbalance; and
   repeating these steps to further reduce the misalignment and vibration.

3. The method according to claim 2, further comprising the steps of:
   reconstructing the orbits of the center of the first rotating shaft;
   deriving the direction in which, and/or angles over which, the first device has to be displaced in order to eliminate misalignment;
   displacing the first device in the direction and/or over those angles until no misalignment is detected;
   determining the vibrations occurring as a result of any unbalance;
   displacing the bearings in the radial direction until no unbalance is detected; and
   checking for any misalignment that has incurred during eliminating of vibrations due to unbalance and if necessary repeating the steps above.

4. A system comprising:
   a first device having a first rotating shaft;
   a second device having a second rotating shaft
   a coupling connecting the first rotating shaft and second rotating shaft, wherein the first device and the second device comprising:
      a housing having two bearings at some distance from each other, via which the shafts are journaled, the bearings comprising:
         an outer ring which is connected to the housing, wherein each outer ring of the bearing is connected to the housing via two displacement means which are at an angle with respect to each other; and
         two vibration sensors which are in radial direction opposite to the displacement means; and
      four supports via which the housing of the first device is supported on a basement, each of the supports comprising a further displacement means for moving the housing of the first device.

5. The system of claim 4, further comprising:
   a vibration controller which is connected to the displacement means;
   a misalignment controller which is connected to the further displacement means; and
   a switch connected to the vibration controller and the misalignment controller, wherein the switch can connect the vibration sensors to the vibration controller or the misalignment controller, and wherein the vibration controller can actuate the switch to connect to the misalignment controller.

6. The system of claim 5, wherein one or more of the displacement means, the further displacement means, and the vibration sensors are piezo elements.

7. The system according to claim 6, wherein at each bearing of the first device, the displacement means and the vibration sensors are both piezo elements, for simultaneously allowing the vibration sensors to measure the displacement and the outer ring to move via the displacement means, and wherein passive elements are present between the outer ring and the housing at places opposite to the piezo elements, which passive elements have a stiffness almost equal to that of the piezo elements.

* * * * *